(12) United States Patent
Yoshigi et al.

(10) Patent No.: US 6,173,900 B1
(45) Date of Patent: Jan. 16, 2001

(54) IC CARD

(75) Inventors: Hiroshi Yoshigi, Hinode; Takehiro Ookawa, Tachikawa; Ryouzou Yoshino, Hadano; Kimiaki Andou, Hamura; Tadashi Oonishi, Musashi-murayama; Koji Tsuru, Iruma; Shin Kanno, Musashino; Shigeru Date, Yokosuka; Hisanobu Dobashi, Nerima-ku; Masahiro Sugiura, Kariya, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/427,596

(22) Filed: Oct. 27, 1999

(30) Foreign Application Priority Data

Oct. 30, 1998 (JP) .................................................. 10-309964

(51) Int. Cl.[7] .................................................. G06V 19/067
(52) U.S. Cl. .......................................... 235/492; 343/720
(58) Field of Search .............................. 342/50; 235/380, 235/492; 343/720

(56) References Cited

U.S. PATENT DOCUMENTS 5,313,211 * 5/1994 Tokada et al. ..................... 342/50

FOREIGN PATENT DOCUMENTS 3-87299    4/1991  (JP) .

OTHER PUBLICATIONS

Data Carrier (III), Nihon–Kogyo Press, Tokyo, Mar., 1991, pp. 137–194.

* cited by examiner

*Primary Examiner*—Harold I. Pitts
(74) *Attorney, Agent, or Firm*—Mattingly, Stanger & Malur, P.C.

(57) ABSTRACT

An object of the present invention is able to provide an IC card in which for example, even if a state should occur in which a plurality of IC cards are piled up in any direction for use, a received signal is not greatly lowered but a normal usage pattern is secured.

When the IC cards are piled up with the contours united, a projection drawing of an antenna of one IC card to an antenna surface of the other IC card has an area not overlapped at least 15% or more of an area having an antenna to the other antenna surface on the projection surface and the IC card can work.

15 Claims, 10 Drawing Sheets

IC CARD

BACKGROUND OF THE INVENTION

1. Field of the Invention

The present invention relates to an antenna member (hereinafter also referred to as an antenna part material). The antenna member according to the present invention is useful to be applied to a so-called IC card. Particularly, the present invention relates to the art durable for use of a plurality of antenna members piled up with or without intention.

2. Description of the Related Art

Lately, an IC card has been developed which embeds an IC chip (a semiconductor integrated circuit element) and an antenna for wireless transmission and reception of data. These are intended to be widely utilized, for example, for a commutation ticket and a coupon ticket in various transport facilities, a telephone card, an in-and-out card to room, an ID card, a license, or a music ticket, etc. Further typical use of the card intended includes the object for pachinko, a card for recreational facilities such as an amusement park, a theater, and so on, for a medical use, or for various applications of self-governing communities, etc. Thus, the present invention can be applied to these various cards.

Figure 1:
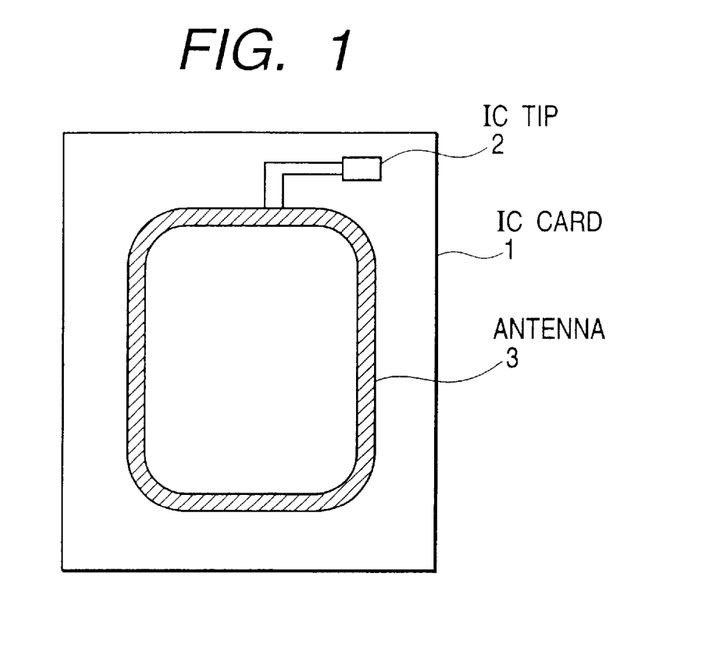
FIG. 1 is a plan view of an IC card of the related art.

As a typical example of an antenna member according to the present invention, there is provided a so-called IC card. FIG. 1 shows a contactless type IC card as one example thereof. FIG. 1 is a plan view showing a conception of the IC card, showing an arrangement of an IC chip 2 and an antenna embedded in an IC card 1. The number of windings of an antenna coil is simplified in the drawing for better understanding of an explanation. In the drawings, for example, FIGS. 9, 12, 13, 14, 15 and 16, showing a card with the similar conception described below, to which similar simplification is likewise applied.

Figure 2:
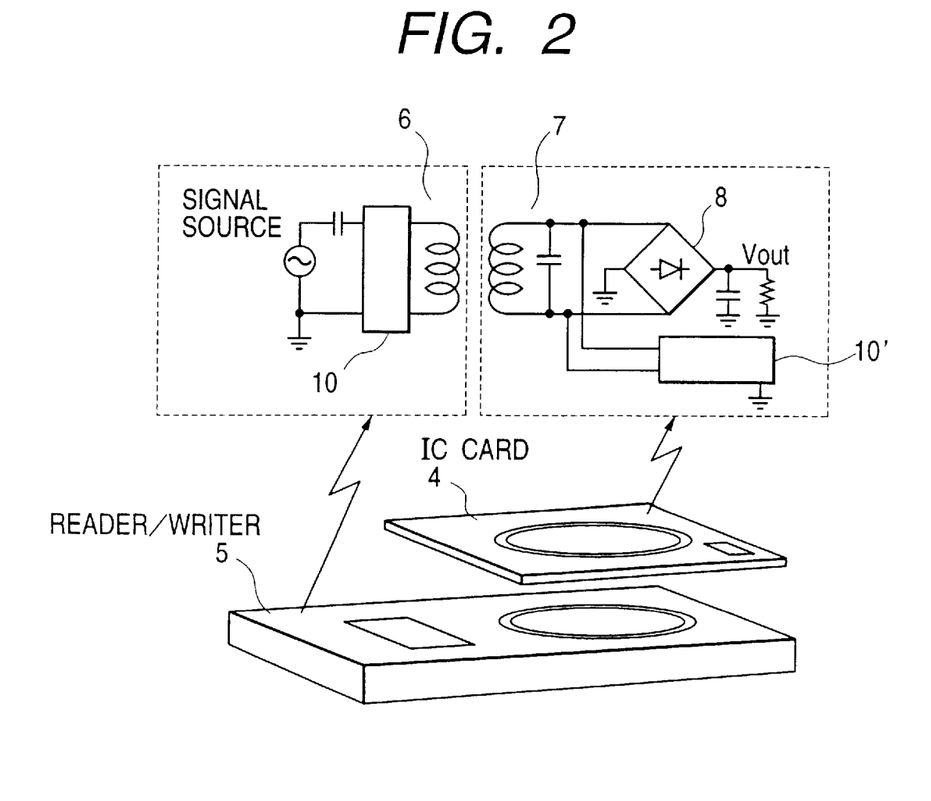
FIG. 2 is a schematic explanatory view showing a usage pattern of the IC card.

FIG. 2 is an explanatory view showing a usage pattern thereof. In this example, an IC card 4 is not always in contact with a data writer-reader 5 (normally called a reader/writer), and exchanges information by an induction electromagnetic field in communication with an antenna 7 embedded in the IC card 4. Because of this reason, the card of this type is called a contactless type. Within the frame indicated by dotted lines at the upper portion of FIG. 2, an antenna 6 mounted on the reader/writer 5, and an antenna 7 and a rectifying circuit 8 mounted on the IC card 4 are illustrated.

Further, this IC card contains no battery, and a supply of power is received through the antenna 7 from the reader/writer 5 side. That is, a signal Vs from the reader/writer 5 is transmitted to the IC card through the antenna 6. The IC card 4 side takes in this signal by the electromagnetic induction through the antenna 7. Generally, a signal source used on the reader/writer side is 13.5 MHz. At this time, a signal is taken in efficiently by resonance with a resonant frequency of a value close to a signal frequency fs by inductance and condenser C of the antenna 7. The thus taken-in signal can obtain a signal voltage Vout by the rectifying circuit 8 embedded in the IC card 4. This signal voltage Vout is supplied to a circuit for the signal processing embedded in the IC card. The circuit used for this purpose and the aforementioned rectifying circuit are incorporated in the IC chip. In FIG. 2, reference numerals 10 and 10' each designates a reader/writer, and a communication controller included in the IC card, respectively.

The general explanation of the IC card appears, for example, on "Data Carrier (II)," Nihon-Kogyo Press, Tokyo: pp. 137–194 March 1991. Further, an IC card using a thin chip has been proposed in Japanese Patent Application Laid-Open No. Hei3-87299.

SUMMARY OF THE INVENTION

It is thus an object of the present invention to provide an IC card, wherein even if a state should occur in which antenna members, such as IC cards are piled up in any direction for use, the received power of the IC cards is not greatly lowered to secure a normal usage pattern. In the present specification, an IC card which is a typical example of an antenna member according to the present invention will be explained as an example. The content of the explanation is regarded as an antenna member according to the present invention including the IC card.

Figure 3:
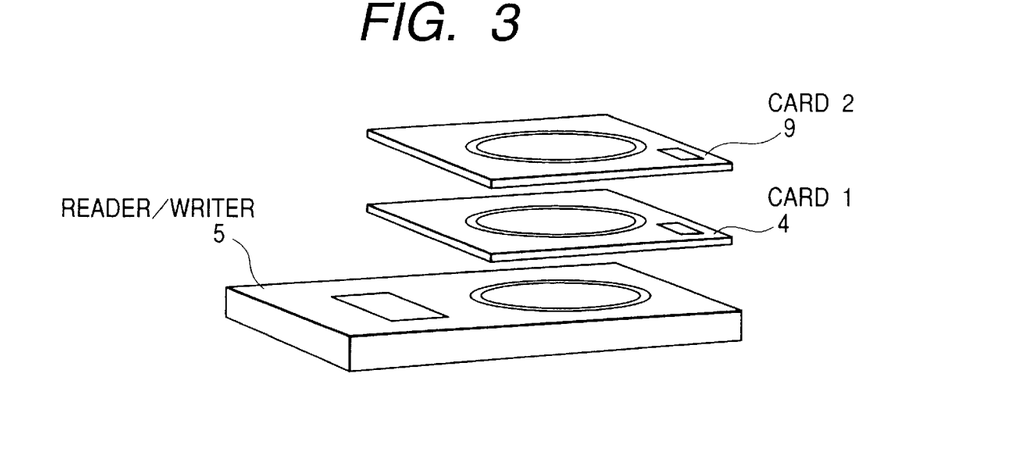
FIG. 3 is a schematic explanatory view showing a usage pattern when a plurality of IC cards are piled up for use.

FIG. 3 schematically shows a state in which a plurality of IC cards 4 and 9 are piled up on a reader/writer 5 in a suitable direction for use.

While in the aforementioned explanation, a description has been made in which a plurality of IC cards are merely piled up for use, it includes (1) the case where a plurality of antenna members are used being piled up, and (2) the case where a plurality of IC cards are piled up without being intended for use. In the case of (1), there are many cases where the same kind of IC cards are used. On the other hand, in the case of (2), often, there are many cases where a different kind of IC cards are not discriminated, but for example, they are inserted into a pass case altogether and are used together with other IC cards for different purposes.

Regarding the way of piling up IC cards, it is generally assumed that they are piled up almost along the contour of the IC card. Examples contemplated include (1) the way of piling up a card by turning it over in a vertical direction (to top and bottom) and lateral direction (to left and right) with respect to a single card, (2) the way of piling up a card by turning it over in a lateral direction relative to a single card, and (3) the way of piling up a card with (1) and (2) compounded. In the case of piling up a plurality (three or more) of cards, a plurality of these ways of piling up are present. Further, there is a case where while one card is in use, the other card is inserted. In this case, the way of piling up changes with time.

A problem will be described hereinafter in the case where a plurality of IC cards are piled up. In the case where a plurality of IC cards are piled up, a plurality of antenna coils of each IC card influence on one another so that capacity and inductance of the antenna coils of each IC card equivalently increase along therewith. That is, this state is that a different antenna coil is arranged parallel to one antenna coil. Therefore, a resonant frequency of the antenna coils of an IC card is deviated to a lower frequency than that of the case where a card is independently used. The deviation of the resonant frequency leads to such a state in which a signal voltage V2 obtained from a signal taken in the IC card considerably lowers, and as a result, a circuit for processing a signal of the IC card become inoperative.

Detailed description of occurrence of a deviation in resonant frequency by a plurality of antenna coils mentioned above will be made later.

The summary of a basic idea of the present invention will be explained, and then various concrete forms of the invention disclosed in the present specification will be explained.

The present invention relates to a shape of an antenna in which when a plurality of IC cards are pilled up for use, even if the IC cards are piled up in any direction, receiving power of the IC cards is not greatly lowered and a normal using condition is secured.

An antenna is a device for radiating or receiving an electromagnetic wave, and for an IC card, in the form of a coil is normally often used. Many of such antenna coils are formed on a fixed IC card substrate. The simplest forming method is to print a conductor for an antenna on an IC card substrate into a desired shape, which is also inexpensive to implement. Or there are methods in which a conductor layer for an antenna is formed on an IC card substrate, followed by etching into a desired shape, and a method in which a conductor for an antenna is formed separately from an IC card substrate to mount it on the substrate later. It is noted that physical or electric specifications such as a thickness, an electric conductivity or the like of an antenna conductor may be applied with the related art ones. As for various techniques other than the antenna shape, such as a tuning circuit, a rectifying circuit or a communication controller and so on shown in FIG. 2, use of the related art ones will suffice. Rather, in the present invention, various electric techniques relating to these IC cards remain as it used to be in the related art, but if a plurality of IC cards are pilled up in any direction for use, receiving power of the IC cards is not greatly lowered and a normal using condition is secured.

The planar shapes of the antenna employ various forms as follows;

(1) When IC cards are piled up with their contours united: A projection drawing of an antenna of one IC card to an antenna surface of the other IC card has an area not overlapped to the other antenna surface on the projection surface, and the concerned IC card can work.

According to the present invention, an electronic circuit for the electrical signal processing remains as it used be, but a voltage for the operation of the electronic circuit can be secured about 30% of working voltage defined in the IC card. Of course, needless to say, it is enough to satisfy the defined voltage, but according to the present invention, it is sufficiently possible to secure 40% or more of the defined working voltage, even 45%, or 50% or more thereof.

(2) When IC cards are piled up with their contours united: A projection drawing of an antenna of one IC card to an antenna surface of the other IC card has an area not overlapped at least 15% or more of an area of an antenna to the other antenna surface on the projection surface.

By using this form of antenna, even if IC cards are piled up in any direction, they can be used. The larger area not overlapped is more preferable for achievement of the object of the present invention. It is preferable to secure 20% or more of the area not overlapped, more preferably, 30% or more. In consideration of the overall variation in manufacture of IC cards including variation in the manufacture of a substrate or an antenna, or variation in the manufacture of an electronic circuit, it is better to secure the area not overlapped 40% or more particularly for the purpose of mass production. Further, for a stable supply of mass produced commodities, it may be useful to use 50% or more.

(3) The shape of the antenna of the IC card on the antenna surface is asymmetrical to left and right and top and bottom.

Further, it is of course possible to have either of or all of the aforementioned various forms (1) to (3) of the planar shape of the antenna.

Preferably, the long axis or the longest side of the antenna shape is longer than the short side of the IC card. Accordingly, the long axis or the longest side of the antenna shape ought to be arranged in the direction of the long side of the IC card. By employing the shape and the arrangement of the antenna as described, in a limited area of the IC card, it is possible to secure large area occupied by the antenna.

Accordingly, this antenna can secure a high inductance. As described above, this form is extremely practical. The long axis of the antenna shape termed herein indicates, in the case where a basic shape of an antenna is geometrically defined as an ellipse or oval to be explained later, its long axis. Further, in the case where a basic shape thereof is other general shapes, a relationship between the longest side thereof and the short side of IC card is taken into consideration. Furthermore, in the case of a shape not including an obvious long side or an undetermined shape, suitable two points of the planar shape are connected by a straight line, the longest straight line is compared with the short side of a substrate of the IC card, and an antenna may be set in accordance with a technical idea in which an antenna coil secures a larger area in a limited area of IC card. In this manner, it is possible to obtain a high inductance. In featuring the present invention, typical examples of schematic forms as fundamentals will be mentioned as follows: Of course, needless to say, modifications for providing the aforementioned various forms (1) to (3) are added with concrete shapes illustrated below as fundamentals. Further, needless to say, the basic shape has a desired shape modification, for example, such as a spiral shape, in order to secure a plurality of numbers of winding to serve as an antenna coil.

Fundamentals of the planar shapes of antennas include, as typical examples, an ellipse or oval, a shape having a straight line portion and a curved line, or polygons including a pentagon, a hexagon, or a diamond shape. An example of the shape having a straight line portion and a curved line is basically, for example, a rectangle, in which desired areas at corner portions are comprised with curved lines, of course, other than the rectangle, there may be employed shapes having a straight line portion. Further, even if an undetermined shape is used as a shape of an antenna coil, it is possible to realize the present invention.

For fundamentals of the planar shape of an antenna, suitable two points of the planar shape are connected by a straight line, the provision of a shape in which the longest straight line is present is effective to obtain a higher inductance in a limited area of an IC card. Examples of having such a shape as just described include an ellipse, a rectangle, and a diamond shape as fundamentals, having curved lines disposed at corners.

Further, the objective of the present invention can be realized by inclusion of a straight line portion in a pattern of an antenna coil and slight rotation of a basic shape. That is, when two cards are piled up, an area not overlapped of a projection drawing of an antenna coil of an IC card to the surface substantially along the substrate surface of an antenna coil of an IC card can be enlarged.

As a typical example of the aforementioned method of deformation, a pattern in which the planar shape of a coil is substantially symmetrical to left and right and top and bottom is rotated at a fixed angle. In this manner, a fixed shape can be displaced obliquely to obtain a shape of an antenna coil applied with the aforementioned various characteristics. Of course, it is possible to obtain a shape of an antenna coil applied with the various characteristics mentioned above by methods other than rotating the substantially symmetrical pattern at fixed angle. The rotation termed herein means the rotation as described below. That is, for example, a position at which a long axis of a basic shape of an antenna coil is parallel to a long side of the IC card is considered as a first position. Then, the long axis of the basic shape of the antenna coil is arranged at a second position, so that its extension may cross with the long side of the IC card.

shift from the first position to the second position is called rotation. In the case where the basic shape is other general shapes, the longest side is considered as the aforementioned long axis. Further, in the case of a shape not including an obvious long side, or an undetermined shape, the longest straight line obtained by connecting suitable two points of the aforementioned planar shape with a straight line may be considered as the aforementioned long axis.

The main point of the aforementioned idea is useful in actual design. According to this idea, for example, the symmetrical position in left and right, and top and bottom directions of the aforementioned basic shape is arranged on a rectangle, as the basic form, card to the position along the desired side of the card and is determined as a first position, from which rotation by a fixed angle θ is applied. When the basic shape is in the form which is not symmetrical to left and right or up and bottom in an accurate sense, a position closest to the symmetry may be considered as a first position.

The present invention is useful in the case where a substrate of IC card is of a thin type. When piling up opposed (front or face, and back) sides of the card facing to each other, the thickness of a substrate of the card presents the main cause of a problem of the present invention. On the other hand, further, when piling up the same (front to front or back to back) sides of the card facing to each other, rather the thickness of the whole card presents its main cause.

The present invention has been generally described above. Now, these are arranged, and main various inventions disclosed in the specification of the present application will be briefly mentioned. It is needless to say that more detailed various arts so far described may be applied in combination with the main various inventions mentioned below according to various inventive idea of the arts.

(1) According to a first aspect of the present invention, there is provided an IC card at least comprising a first substrate, an IC element arranged on a fixed portion of the first substrate, an antenna electrically connected to the IC element, and a second substrate at least covering the IC element and the antenna, wherein when the IC cards are piled up with the contours united, a projection drawing of an antenna of one IC card to an antenna surface of the other IC card has an area not overlapped to the other antenna surface on the projection surface, and the concerned IC card can work.

(2) According to a second aspect of the present invention, there is provided an IC card at least comprising a first substrate, an IC element arranged on a fixed portion of the first substrate, an antenna electrically connected to the IC element, and a second substrate at least covering the IC element and the antenna, wherein when the IC cards are piled up with the contours united, a projection drawing of an antenna of one IC card to an antenna surface of the other IC card has an area not overlapped at least 15% or more of an area having an antenna to the other antenna surface on the projection surface.

(3) According to a third aspect of the present invention, there is provided an IC card at least comprising a first substrate, an IC element arranged on a fixed portion of the first substrate, an antenna electrically connected to the IC element, and a second substrate at least covering the IC element and the antenna, wherein a shape of the antenna on the antenna surface is asymmetrical with respect to left and right and top and bottom.

In any aspects (4) to (6) of the present invention, a long axis of a basic shape of an antenna, the longest side or the longest straight line obtained by connecting suitable two points by a straight line is longer than a short side of the IC card. By the provision of this aspect, a higher inductance can be secured in a limited area of an IC card.

(4) According to a fourth aspect of the present invention, there is provided an IC card at least comprising a first substrate, an IC element arranged on a fixed portion of the first substrate, an antenna electrically connected to the IC element, and a second substrate at least covering the IC element and the antenna, wherein in the case where a long axis of a shape of the antenna, the longest side of the longest straight line obtained by connecting suitable two points with a straight line is longer than a short side of the IC card, and when the IC cards are piled up with the contours united, a projection drawing of an antenna of one IC card to an antenna surface of the other IC card has an area not overlapped to the other antenna surface on the projection surface, and the antenna member can work.

(5) According to a fifth aspect of the present invention, there is provided an IC card at least comprising a first substrate, an IC element arranged on a fixed portion of the first substrate, an antenna electrically connected to the IC element, and a second substrate at least covering the IC element and the antenna, wherein when a long axis of a shape of the antenna, the longest side of the longest straight line obtained by connecting suitable two points with a straight line is longer than a short side off the IC card, and when the IC cards are piled up with the contours united, a projection drawing of an antenna of one IC card to an antenna surface of the other IC card has an area not overlapped at least 15% or more of an area of the antenna to the other antenna surface on the projection surface.

(6) According to a sixth aspect of the present invention, there is provided an IC card at least comprising a first substrate, an IC element arranged on a fixed portion of the first substrate, an antenna electrically connected to the IC element, and a second substrate at least covering the IC element and the antenna, wherein when a long axis of a shape of the antenna, the longest side of the longest straight line obtained by connecting suitable two points with a straight line is longer than a short side of the IC card, and a shape of the antenna on the antenna surface is asymmetrical with respect to left and right and top and bottom.

In any aspects (7) to (9) of the present invention, an antenna coil is formed on the IC substrate. This aspect is extremely practical.

(7) According to a seventh aspect of the present invention, there is provided an IC card at least comprising a first substrate, an IC element arranged on a fixed portion of the first substrate, an antenna electrically connected to the IC element, and a second substrate at least covering the IC element and the antenna, wherein the antenna is a coil formed on the first substrate, and when the IC cards are piled up with the contours united, a projection drawing of an antenna of one IC card to an antenna surface of the other IC card has an area not overlapped to the other antenna surface on the projection surface, and the antenna member can work.

(8) According to an eighth aspect of the present invention, there is provided an IC card at least comprising a first substrate, an IC element arranged on a fixed portion of the first substrate, an antenna electrically connected to the IC element, and a second substrate at least covering the IC element and the antenna, wherein the antenna is a coil formed on the first substrate, and in the case where the IC cards are piled up with the contours united, a projection drawing of an antenna of one IC card to an antenna surface of the other IC card has an area not overlapped at least more than 15% of an area of the antenna to the other antenna surface on the projection surface.

(9) According to a ninth aspect of the present invention, there is provided an IC card at least comprising a first substrate, an IC element arranged on a fixed portion of the first substrate, an antenna electrically connected to the IC element, and a second substrate at least covering the IC element and the antenna, wherein the antenna is a coil formed on the first substrate, and a shape of the antenna on the antenna surface is asymmetrical with respect to left and right and top and bottom.

(10) According to a tenth aspect of the present invention according to any one of the aspects (1) to (9) of the present invention, there is provided the IC card wherein a planar shape to be basic of the antenna is an ellipse or an oval.

(11) According to an eleventh aspect of the present invention according to any one of aspects (1) to (9) of the present invention, there is provided the IC card wherein a planar shape to be a fundamental of the antenna includes a straight line portion.

(12) According to a twelfth aspect of the present invention according to any one of aspects (1) to (9) of the present invention, there is provided the IC card, wherein a planar shape to be a fundamental of the antenna is replaced in corner portions of a polygon by curved lines.

(13) According to a thirteenth aspect of the present invention, there is provided an antenna member at least comprising a first substrate, an antenna arranged on a fixed portion of the first substrate, and a second substrate at least covering the antenna, the antenna member capable of carrying out transmission and reception of a signal by wireless, wherein when the antenna members are piled up with the contours united, a projection drawing of an antenna of one antenna member to an antenna surface of the other antenna member has an area not overlapped to the other antenna surface on the projection surface, and the antenna member can work.

(14) According to a fourteenth aspect of the present invention, there is provided an antenna member at least comprising a first substrate, an antenna arranged on a fixed portion of the first substrate, and a second substrate at least covering the antenna, the antenna member capable of carrying out transmission and reception of a signal by wireless, wherein when the antenna members are piled up with the contours united, a projection drawing of an antenna of one antenna member to an antenna surface of the other antenna member has an area not overlapped at least 15% or more of an area of the antenna to the other antenna surface on the projection surface.

(15) According to a fifteenth aspect of the present invention, there is provided an antenna member at least comprising a first substrate, an antenna arranged on a fixed portion of the first substrate, and a second substrate at least covering the antenna, the antenna member capable of carrying out transmission and reception of a signal by wireless, wherein a shape on the antenna surface of the antenna is asymmetrical with respect to left and right and top and bottom.

According to the antenna member described in the (13) to (15), preferably, the antenna coil is formed on the first substrate. The antenna member described in the (13) to (15) is more useful when used in a thin type card.

Needless to say, various inventions so far described in (1) to (15) can be combined and applied according to an inventive idea.

DETAILED DESCRIPTION OF THE PREFERRED EMBODIMENTS

Prior to the explanation of the embodiments of the present invention, the principle of basic operation of the present invention will be explained. It is noted that the reason for occurrence of variation in resonant frequency by use of a plurality of antenna coils will be also compared and explained. The advantages of the present invention will be sufficiently understood from the comparison and explanation.

Figure 4:
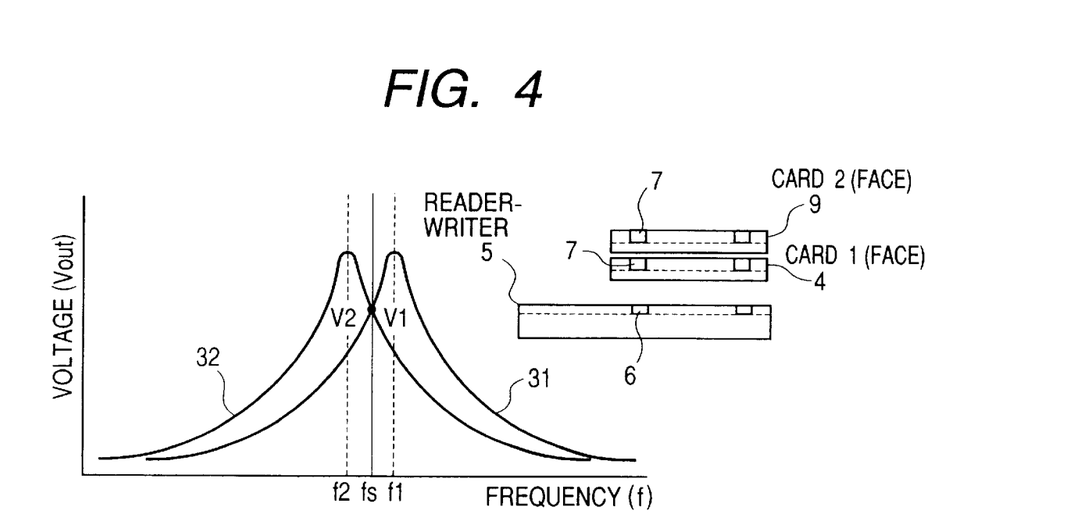
FIG. 4 is a view showing a relationship between a usage pattern when IC cards of the related art type are piled up, putting in the same direction for use and a received signal voltage.
Figure 5:
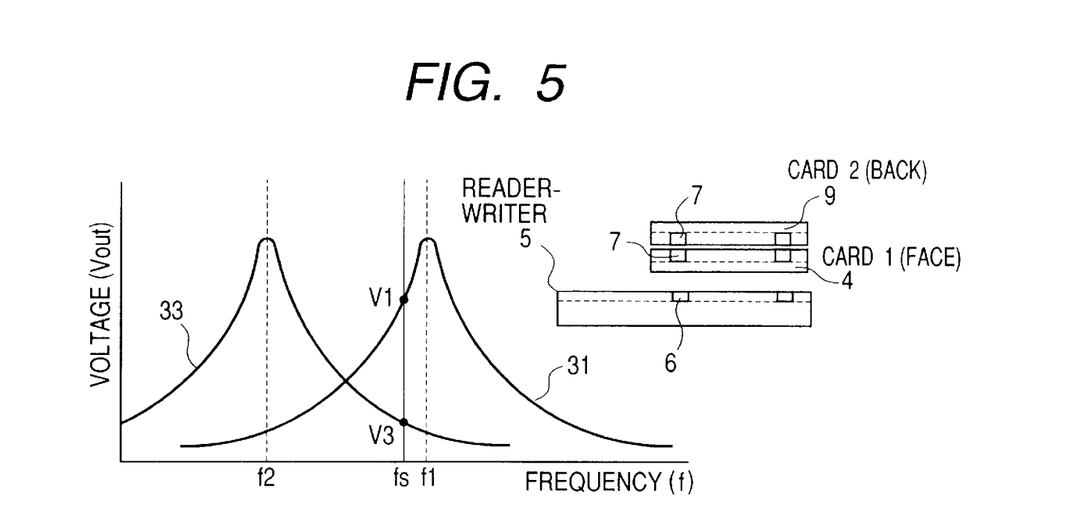
FIG. 5 is a view showing a relationship between a usage pattern when IC cards of the related art type are pilled up so as to face the opposed (front or face, and back) sides each other for use and a received signal voltage.
Figure 6:
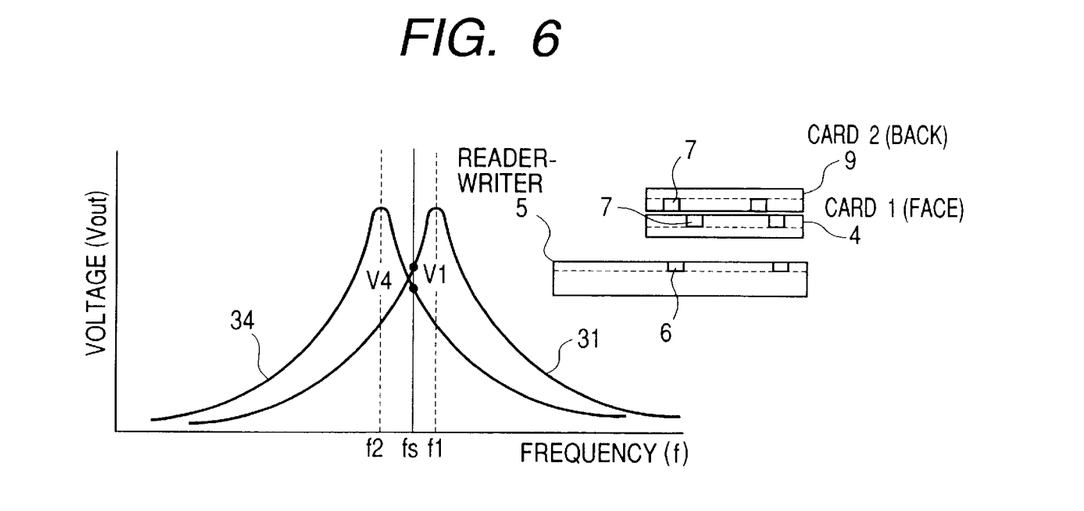
FIG. 6 is a view showing a relationship between a usage pattern when IC cards according to the present invention are piled, putting in the same direction for use and a received signal voltage.

FIGS. 4, 5 and 6 show a relationship between various usage patterns of IC cards and received signal voltages. It is noted that views schematically showing a section in which two IC cards 4 and 9 are opposed to a reader/writer 5 are shown on the top right portion of each drawing. Reference numeral 6 designates an antenna of a reader/writer, and reference numeral 7 designates an antenna of an IC card. In these drawings, parts applied with reference numerals and parts indicated with oblique lines indicate antennas, respectively.

FIG. 4 shows an example in which two IC cards of the related art 4 and 9 are piled up in the same direction, for example, putting "front or face," on top, and opposed to the reader/writer 5. FIG. 5 shows an example in which two IC cards of the related art 4 and 9 are piled up with their "front or face," and "back" facing to each other. That is, in this example, the first IC card 4 on the reader/writer 5 side is placed with the back thereof opposed to the reader/writer 5, while the second IC card 9 is piled up on the first IC card 4 with its front or face, thereof opposed to the first card 4, or the reader/writer 5 side.

FIG. 6 shows an example using IC cards to which the present invention is applied. The way of piling IC cards is similar to that of FIG. 5. A sectional schematic view of IC cards and a reader/writer shows that the positions of antenna coils 6 and 7 indicated with the oblique line be deviated in a vertical direction. This deviation schematically shows a portion in which projection drawings of both antennas 6 and 7 so far described are not overlapped.

When a plurality of IC cards are piled up, a plurality of antenna coils of the IC cards influence on each other to equivalently increase capacity and inductance of the antenna coils of the IC cards. Therefore, occurrence of deviation in resonant frequency of an antenna coil for an IC card to lower frequency than the case where a card is individually used has been mentioned in the column of [SUMMARY OF THE INVENTION]. This phenomenon will be explained with reference to FIGS. 4 and 5.

When only a single card is used, its resonant characteristic is shown by a curve 31. Accordingly, the resonant frequency is indicated by f1. At this time, since a tuning circuit for enabling IC card 4 to work has tuning frequency fs, an output voltage Vout obtained by this tuning circuit is V1. As shown in FIG. 4, when two IC cards 4 and 9 are piled up, the resonant characteristic is changed into a curve 32 by the influence between the antennas of two IC cards 4 and 9. Accordingly, an output voltage Vout obtained by the tuning circuit is V2. In this manner, when both cards are piled up with their "front or face," put on top, an output voltage Vout has substantially the same value. Therefore, the apparatus using the IC cards can perform normal operation for the reasons as follows.

Figure 7A:
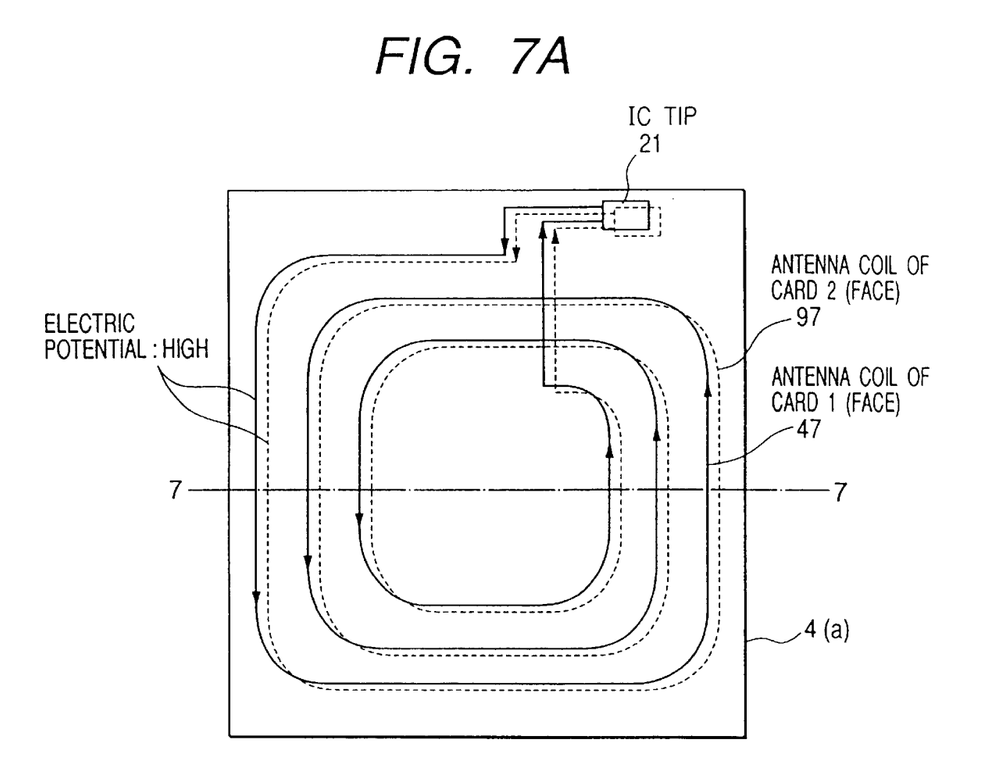
FIGS. 7A and 7B are respectively views showing, when the IC cards of the related art are piled up as shown in FIG. 4, a potential induced in both cards and a flow of current.
Figure 7B:
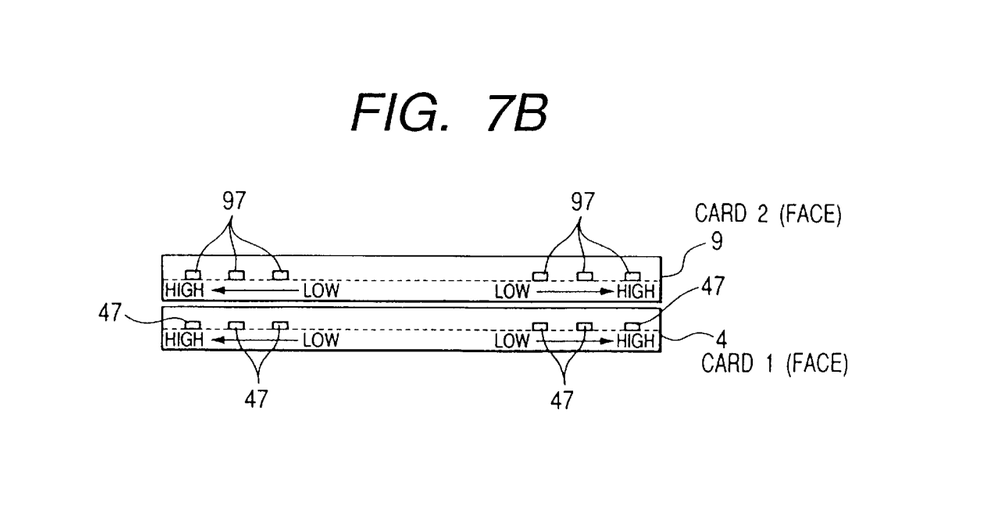

In case of an example shown in FIG. 4, since both cards are piled up with their front or face, put on top, the antenna coils of the first card and the second card overlays one on another. FIG. 7A shows, when the cards are piled up in such the manner as described, a potential induced in antenna coils of both cards, and a flow of current. FIG. 7B shows a section of both cards, and explains a potential induced in antenna coils embedded. This sectional view is taken along AA of FIG. 7A. It is to be noted that the number of windings of the antenna coil is simplified in the drawing for better understanding of explanation.

Since antenna coils 47 and 97 of the first card 4 and the second card 9 are piled up, potentials induced in both the cards 4 and 9 are generally equal. That is, as shown in FIG. 7, the antenna coils having a high potential and the antenna coils having a low potential are substantially piled up. Accordingly, a potential difference between both the coils 47 and 97 rarely occurs. Because of this, the output voltage Vout has substantially the same value as described above with reference to FIG. 4.

Figure 8A:
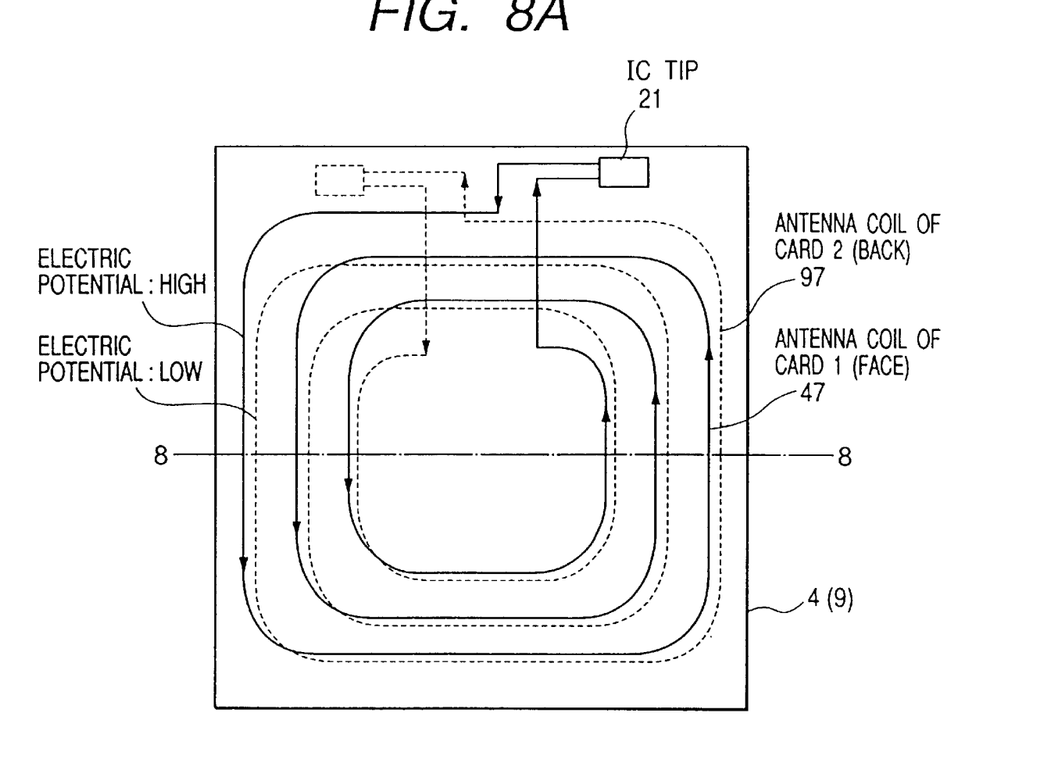
FIGS. 8A and 8B are respectively views showing, when the IC cards of the related art are piled up as shown in FIG. 5, a potential induced in both cards and a flow of current.
Figure 8B:
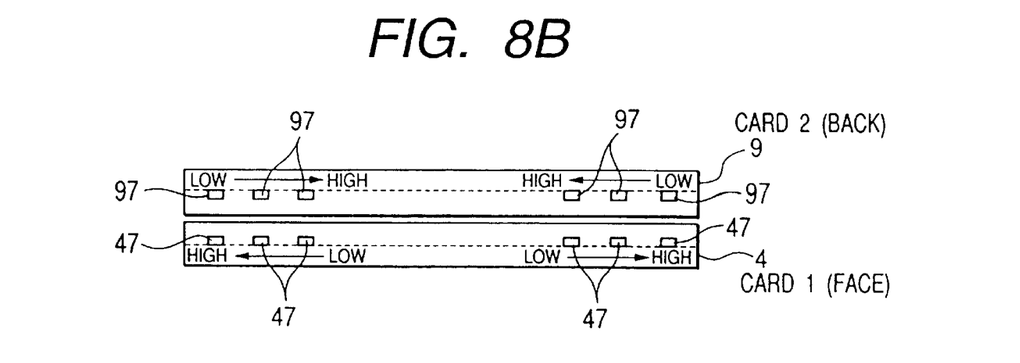

However, in the case where the way of piling up as shown in FIG. 5 previously mentioned is carried out, a difference in output potentials is extremely large. This will be studied. That is, this is an example in which two IC cards 4 and 9 are piled up with their "front or face," and the "back" facing to each other. Accordingly, there assumes a form in which the antenna coils 47 and 97 of the first card 4 and the second card 9 are piled up together. In this case, there shows a change in that a potential is reversed. FIG. 8A shows, when the cards are piled up as in FIG. 5, potentials induced in antenna coils of both cards, and a flow of current. FIG. 8B shows a section of both cards, and explains a potential induced in an antenna coil embedded therein. This sectional view is taken on AA of FIG. 8A. When a current flows, due to electromagnetic induction, from the outside of the first coil 47 toward the inside thereof, the outer periphery of the first coil 47 is a high potential. In this case, in the second coil 97, its outer periphery is a low potential. Conversely, when the outer periphery of the first coil 47 is a low potential, the outer periphery of the second coil 97 is a high potential.

Accordingly, there is always generated a potential difference between the first coil 47 and the second coil 97. This potential difference brings forth a coupling capacity of both the coils to influence on the resonant frequency. As can be seen in FIG. 5, when only a single IC card is used, its resonant characteristic is shown by a curve 31. Accordingly, the resonant frequency is f1. At this time, since a tuning circuit for enabling the IC card 4 to work has a tuning frequency fs, an output voltage Vout obtained by the tuning circuit is V1. However, when two IC cards are piled up as shown in FIG. 5, the resonant characteristic is changed into a curve 33 by the influence between antennas of the two IC cards 4 and 9. Accordingly, an output voltage obtained by the tuning circuit 3 is V3. When both cards are piled up with their "front or face, and back" facing to each other, an output voltage Vout obtained lowers considerably. Therefore, the circuit of IC cards becomes disabled in operation as shown in FIG. 5.

Figure 9:
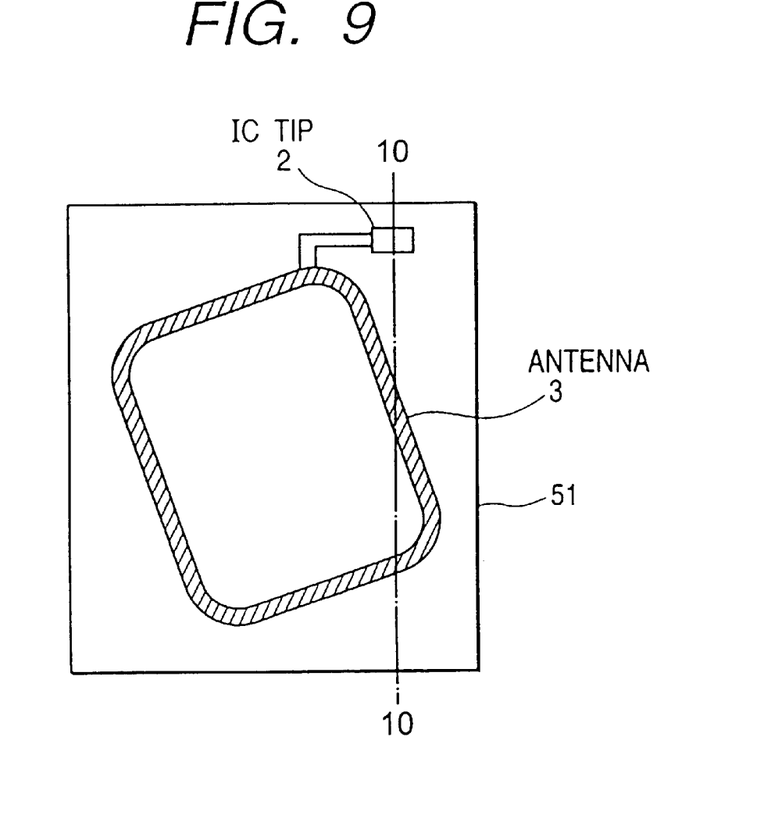
FIG. 9 is a plan view of an example of IC card according to the present invention.

Next, the embodiments of the present invention will be explained. FIG. 9 is a plan view of an IC card showing a typical embodiment of the present invention. The drawing shows an arrangement of an IC chip 2 and an antenna 3 embedded in a card 51. This drawing shows an example in which an axis parallel to a long side of a rectangular coil pattern having curved lines at corners is rotated by a fixed angle with respect to a long side of a rectangular IC card. The number of windings and a resistance value of the coil used are sufficient to be normal values. While the rotational angle of the coil pattern is set in consideration of conditions such as a shape of an antenna coil, a width of a coil, conductivity and the like, the rotational angle is normally on the order of from 10 degrees to 45 degrees. Since an axis 63 parallel to a long side 61 of the antenna coil 3 is obliquely inclined to an angle θ with respect to a long side 52 of a rectangular IC card to arrange a pattern of the antenna 3, it is asymmetrical with respect to an axis parallel to short and long sides of a rectangular card.

Figure 10:
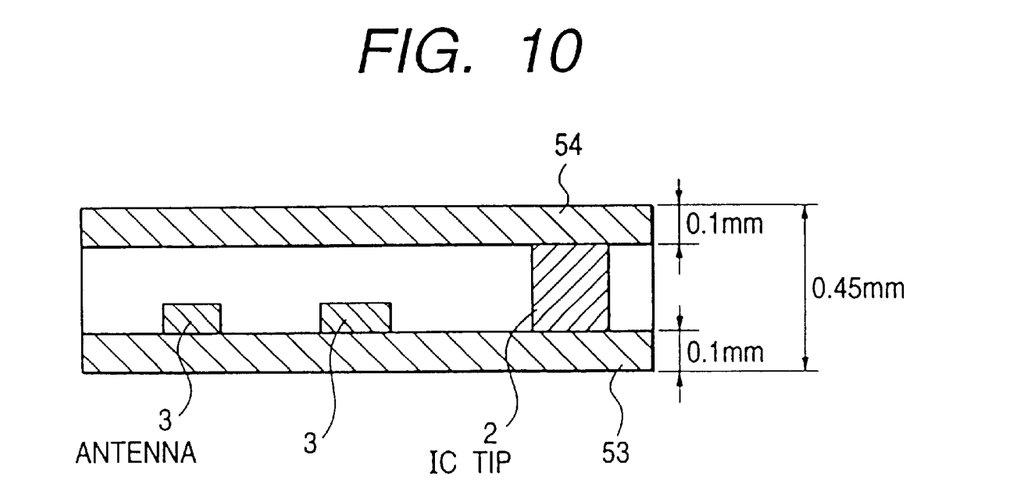
FIG. 10 is a sectional view of an IC card according to the present invention.
Figure 11:
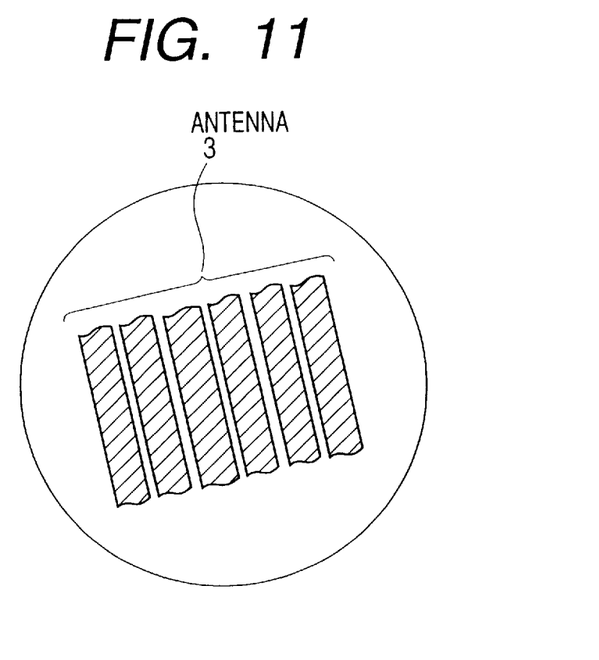
FIG. 11 is an enlarged plan view of an antenna coil of IC card according to the present invention.

FIG. 10 is a sectional view showing a section taken on AA of the IC card of FIG. 9. FIG. 11 is a partial enlarged view of the antenna coil. In FIG. 10, reference numeral 53 designates a first substrate; 54 a second substrate; 2 an IC chip; and 3 an antenna. These FIGS. 9, 10 and 11 show examples of concrete dimensions. This configuration is of an extremely thin type such that each substrate is 0.1 mm, a space between substrates is 0.25 mm, and a thickness of IC card is 0.45 mm.

In IC card, a long side is 86 mm, and a short side is 54 mm. The antenna coil 3 is rectangular in basic shape, a long side of the outermost antenna being 60 mm, a short side thereof being 40 mm. A width of a coil portion is 5.3 mm, and the angle of inclination (θ) is 15 degrees. The number of windings of a coil is 6 turns. The coil is formed from a conductor of 0.8 mm. The space is set to 0.1 mm. Accordingly, in the aforesaid basic rectangular shape, a long side of the innermost antenna of an antenna is 49.4 mm, and a short side is 29.4 mm.

The general method of setting up the thickness of an IC card is not unconditionally from the characteristic of antenna, the characteristic of tuning circuit, etc. However, the present invention is useful also in the case where the thickness of a thin type IC card, for example, is not in excess of 0.78 mm. Its usefulness increases for the IC card 0.6 mm or less in thickness. Further, for the IC card 0.5 mm or less in thickness particularly increases its usefulness.

Further, when the back and the front or face, of a card facing to each other are piled up, the thickness of a substrate for the card practically poses a problem, but the present invention is extremely useful for a thin substrate out of substrates for IC card 0.1 mm or less in thickness. In this case, since an IC chip and an antenna coil are embedded in the IC card in the present example, the thickness of the whole card is 0.45 mm. of course, the thin thickness of the substrate for IC card with 0.09 mm or less increases usefulness of the present invention. Furthermore, for the IC card less than 0.08 mm in thickness particularly increases its usefulness.

Figure 12:
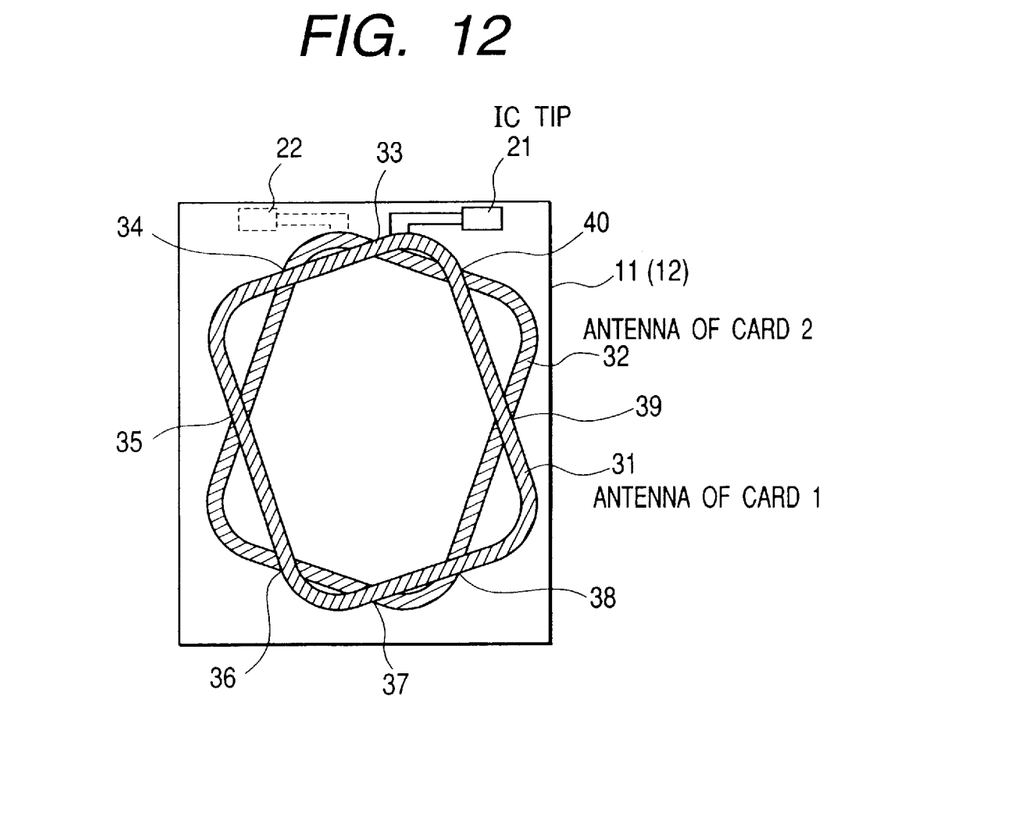
FIG. 12 is an explanatory view when IC cards are piled up with their lateral directions turned over according to a first embodiment of the present invention.

FIG. 12 shows a state in which two IC cards having an antenna coil according to an embodiment are piled up. The first IC card 11 is piled up with its "front or face," put on top, and the second IC card 12 is piled thereon with its lateral direction turned over. An antenna of the first card 11 is designated at 31; IC chip at 21; and an antenna of the second card 12 is designated at 32, and IC chip at 22. The number of windings of an antenna coil is shown in a simplified form for better understanding of explanation similar to FIG. 1. That is to show a general contour of the antenna coil. Naturally, an antenna coil indicated at 31 has the fixed number of windings of the coil. In the following, a schematic plan view of the IC card is likewise simplified.

Figure 13:
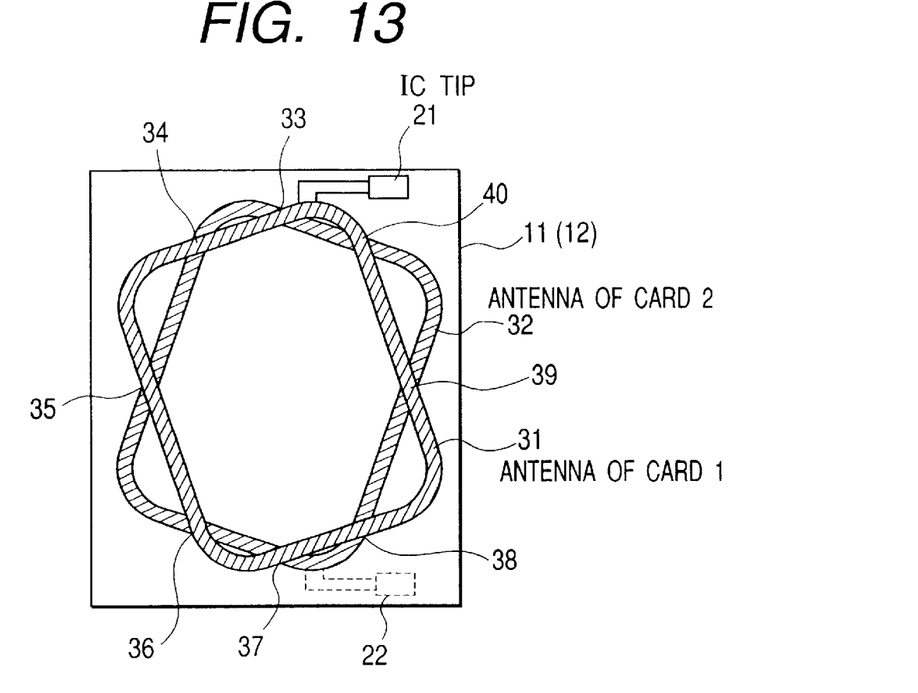
FIG. 13 is an explanatory view when IC cards are piled up with their vertical directions turned over according to a first embodiment of the present invention.

FIG. 13 shows a state that the first IC card 11 is piled up with its "front or face," put on top, and the second IC card 12 is piled thereon with its vertical direction turned over. An antenna of the first card 11 is designated at 31; IC chip at 21; and an antenna of the second card 12 is designated at 32, and IC chip at 22. As can be seen in FIGS. 12 and 13, according to the present invention, even if IC cards are piled up while each being turned over in any directions of top and bottom or left and right, a pattern of an antenna coil has an area not overlapped to a projection drawing to a fixed plane. For example, various portions indicated at reference numerals 33, 34, 35, 36, 37, 38, 39 and 40 show areas where a first coil 31 and a second coil 32 are overlapped. The same is also true for FIG. 12.

An area not overlapped in the present example occupies 45%. The larger be the area not overlapped, the more preferably be achieved the object of the present. The area not overlapped secured in the present example should be at least 15% or more as explained in general. This area is preferably not less than 30%. An area in excess of 40% is preferably secured particularly for the purpose of mass production in consideration of whole dispersion in the manufacture of IC card, such as dispersion in the manufacture of substrate and antenna, or dispersion in the manufacture of electronic circuit. It has been useful that 50% or more is used for a stable supply of mass products.

FIG. 6 shows a relationship, when IC cards according to an embodiment of the present invention are piled up by turning them over, between resonant frequency and received voltage. In case of a single IC card, its resonant characteristic is indicated by curve 31. Accordingly, the resonant frequency is fl. Since at this time, a tuning circuit for enabling the IC card 4 to work has a tuning frequency fs, an output voltage Vout obtained by the tuning circuit is V1. When two IC cards 4 and 9 are piled up as shown in FIG. 6, the antenna coils 6 and 7 embedded in both cards have portions not overlapped, and therefore, coupling of these antenna coils is weak. Accordingly, a change in resonant characteristic is also small, which is shown by a curve 34, for example. Because of this, an output voltage Vout obtained by the tuning circuit 3 is V4. When both cards are piled up with their front or face, the other way round, the lowering of the output voltage Vout stays small. Therefore, the operation of the apparatus using the IC card is not affected substantially, but the normal operation is enabled.

In the present example, while leaving the electronic circuit for the electric signal processing as it is, approximately 95% or more of working voltage defined in the IC card is secured as voltage for operation of the electronic circuit. In the present example, an area not overlapped of the antenna is 50%, and used at working voltage 4.5V.

Of course, needless to say, it is enough to secure the defined voltage, but according to the present invention, it is also possible to secure 40% or more of working voltage defined, or 45% or more, or even 50% or more. When the area not overlapped of the antenna is smaller than that of the aforementioned example, an output voltage is low. When a reference working voltage is 4.5 V as in the present example, the present IC card is possible to secure on the order of 2.0 V to 2.5 V, even if a card encounters any situation to operate the apparatus.

This working voltage depends upon any of resonant frequency as described previously. In the present example, when a normal resonant point of a single card is about 20 MHz, it was in such a state that the resonant frequency was deviated about 40% of frequency. According to the present invention, it is possible to suppress the deviation to about 30% of frequency. According to the present invention, this deviation would meet a practical limit in about 20% of frequency.

Further, even when, during the use of the first card, the second card is gradually piled up along the sides of the card, no substantial overlapped state occurs in a pattern of an antenna coil in the midst thereof. Accordingly, the lowering of an induced voltage will not occur even instantaneously in the tuning circuit.

Figure 14:
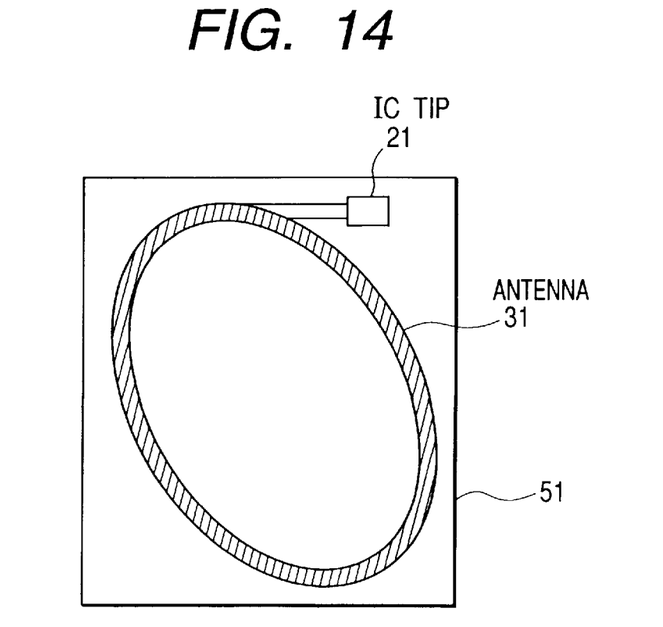
FIG. 14 is a plan view of a further example of IC card according to the present invention.
Figure 15:
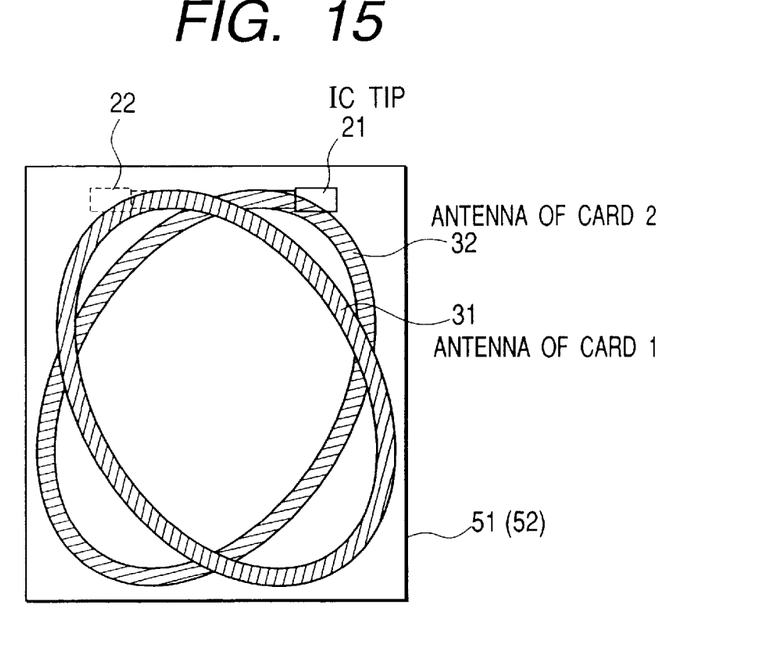
FIG. 15 is an explanatory view when IC cards are 10 piled up with their lateral directions turned over according to a second embodiment of the present invention.
Figure 16:
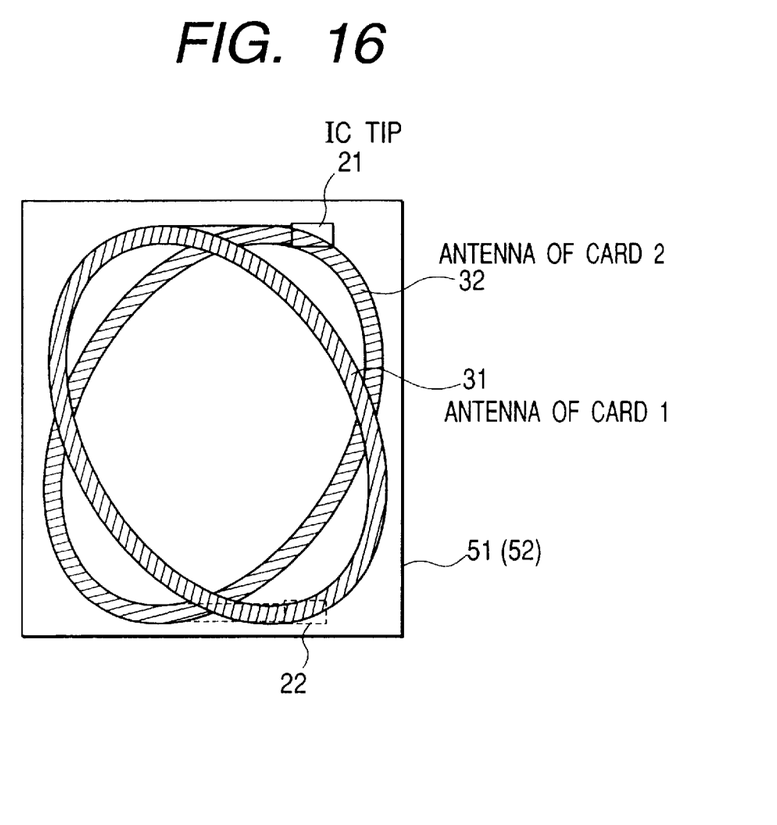
FIG. 16 is an explanatory view when IC cards are piled up with their vertical directions turned over according to a second embodiment of the present invention.

FIG. 14 shows an example of an another pattern of an antenna coil. In this pattern, a substantially symmetrical ellipse is inclined at a fixed angle. This inclination angle is normally selected to be on the order of 10 to 45 degrees. FIGS. 15 and 16 are respectively show an example in which two cards are piled up with their lateral direction turned over, and an example in which they are piled up with their top and bottom turned over. In these drawings, an antenna of a first card 11 is designated at 31 and an IC chip at 21, and antenna of a second card 12 is designated at 32, and an IC chip at 22.

These examples can be said similar to those of FIGS. 12 and 13. That is, also in the present example, when both the cards are piled up with their front put on top, the lowering of an output voltage Vout remains small. Therefore, the operation of the apparatus using this IC card is not substantially affected but the normal operation is enabled.

Further, even when the second cards are gradually piled up while the first cards are in use, no state that the pattern of an antenna coil is overlapped in the midst thereof will occur. Accordingly, no lowering of induced voltage occurs in the tuning circuit even instantaneously.

Figure 17:
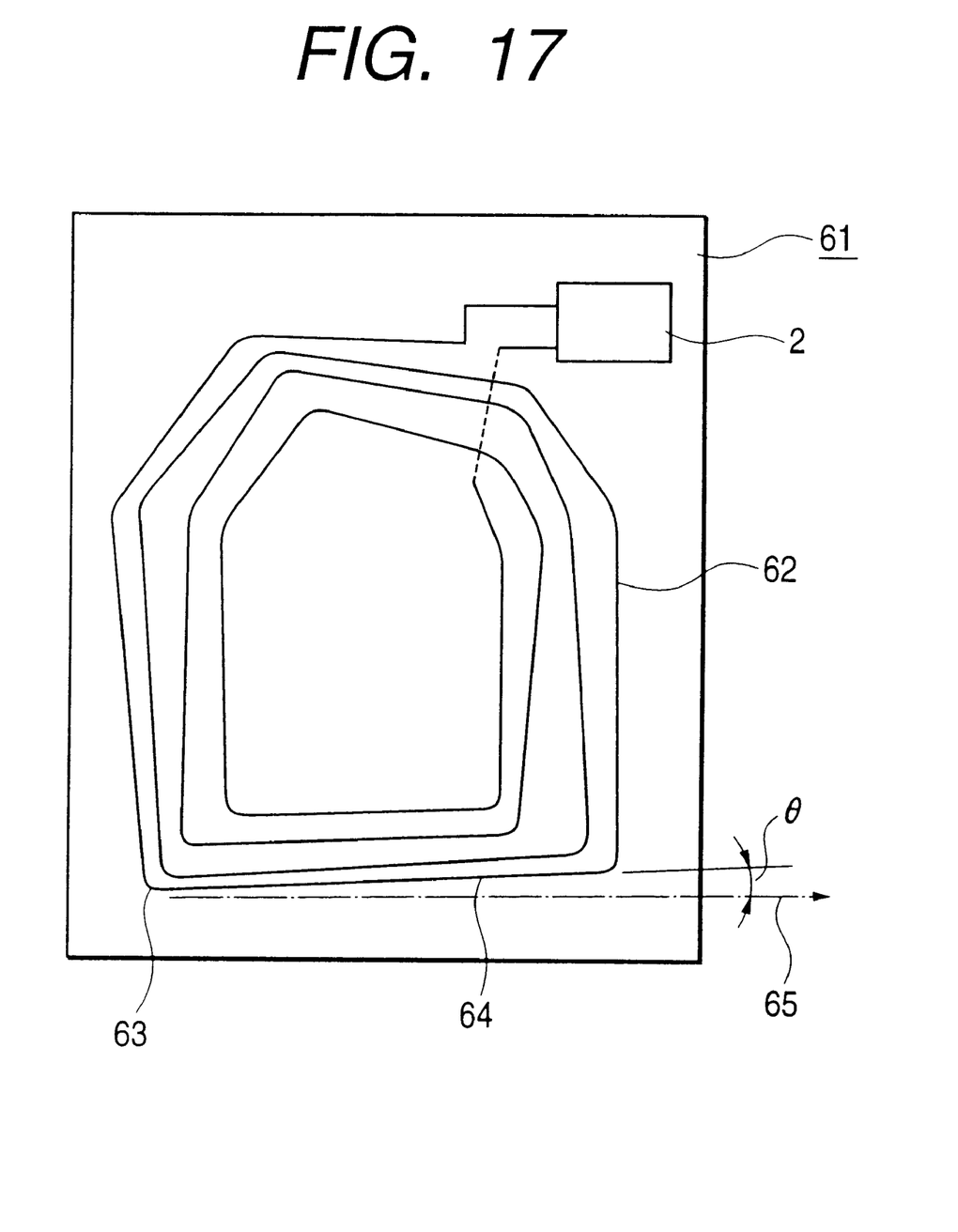
FIG. 17 is a plan view of an another example of IC card according to the present invention.

FIG. 17 is a plan view showing an IC card having a yet another antenna shape. In this example, an antenna coil 62 is basically pentagonal, but its sides have a suitable length. Further, each corner of the pentagon is replaced by a curve 63. Further, the way of winding an antenna coil is not uniform. In this example, for example, an arrangement of the fundamental of the basically pentagonal shape to a position along the short side of the card whose basic form is rectangular is set as a first position, and it is rotated by a fixed angle therefrom. In this example, the basic shape of the coil is not pentagonal in a correct sense. However, an arrangement closest to the lateral symmetry of the coil shape is set to a first position and the design is studied, which is useful in actual design. In the present example, the longest base 64 of the pentagon is arranged at a position rotated by 15 degrees in a direction 65 along the short side of the card 61. In the present example, the antenna coil is present over the substantially whole area of the card, and its shape is uneven. Therefore, the piling of antennas, due to the piling of cards, tends to be extremely small.

Accordingly, in any condition, this form of the embodiment is operated in an extremely stable manner. Also in the present example, when both cards are piled up with their front or face, put on top, the lowering of an output voltage Vout remains small. Therefore, the operation of the apparatus using this IC card is not substantially affected but the normal operation is enabled.

Further, even when the second cards are gradually piled up while the first cards are in use, no state that the pattern of an antenna coil is overlapped in the midst thereof will occur. Accordingly, no lowering of induced voltage occurs in the tuning circuit even instantaneously.

The method of utilizing the IC card according to the present invention will be briefly explained hereinafter.

The method of utilization which is effective upon making use of the present invention is roughly divided into two aspects. According to a first aspect, a plurality of IC cards with an antenna are inserted into a desired apparatus having a read/write; and according to a second aspect, when a card is used contactlessly for a desired apparatus having a read/write, a plurality of IC cards with an antenna are united and held. In latter case, often, a plurality of cards different in purpose for use are united and held. This will be explained in detail below.

In the first example, the present IC card is used as a telephone card. A telephone set is provided with a card slot into which a plurality of telephone cards can be inserted. In most case, it is possible to insert about three telephone cards. Of course, it is also possible to insert a number of cards. Even if a plurality of IC cards according to the present invention are inserted into a card slot for use, the telephone can be used similarly to the case of a single card. In this case, even when one or two cards are added during telephone conversation, the conversation can be continued without any trouble. By virtue of the present invention, a telephone can be used without caring the direction to insert an IC card to be used.

When a plurality of cards are inserted, a reader/writer mounted on the telephone periodically delivers a command and detects that a card has been inserted in response to the card inserted. Conversely, when the cards are removed, there is no response returned from the cards, and the reader/writer detects that the cards are removed. The operation such as the delivery of command, response, detection or the like is controlled by the communication controller.

Next examples of the usage pattern of cards are used for a passenger ticket, an entrance ticket or the like. By making use of the cards according to the present invention, even when a plurality of passenger tickets of IC cards with an antenna, and other IC cards with an antenna are piled up in a suitable direction and inserted into a pass case for use, they can be used without taking them out of the pass case. The aforementioned IC cards with an antenna include generally, as an example, an ID card, a money card or the like.

In the present specification, a contactless type IC card has been mainly explained as an example. However, for example, the present invention is useful with respect to a card having a means for delivering and receiving information using a wireless, such as a so-called compound card expected to become popular in future. The compound card mentioned herein is a card in which a contact type card and a contactless type card are compositely loaded.

The present invention is able to provide an IC card in which for example, even when a plurality of IC cards are piled up in any direction for use, a received signal is not greatly lowered but a normal usage pattern is secured.

What is claimed is:

1. An IC card at least comprising a first substrate, an IC element arranged on a fixed portion of said first substrate, an antenna electrically connected to said IC element, and a second substrate at least covering said IC element and said antenna, wherein:

when the concerned IC cards are piled up with the contours united, a projection drawing of an antenna of one IC card to an antenna surface of the other IC card has an area not overlapped to said other antenna surface on said projection surface, and the concerned IC card can work.

2. An IC card at least comprising a first substrate, an IC element arranged on a fixed portion of said first substrate, an antenna electrically connected to said IC element, and a second substrate at least covering said IC element and said antenna, wherein:

when said IC cards are piled up with the contours united, a projection drawing of an antenna of one IC card to an antenna surface of the other IC card has an area not overlapped at least 15% or more of an area having an antenna to said other antenna surface on said projection surface.

3. An IC card at least comprising a first substrate, an IC element arranged on a fixed portion of said first substrate, an antenna electrically connected to said IC element, and a second substrate at least covering said IC element and said antenna, wherein a shape of said antenna on said antenna surface is asymmetrical with respect to left and right and top and bottom.

4. An IC card at least comprising a first substrate, an IC element arranged on a fixed portion of said first substrate, an antenna electrically connected to said IC element, and a second substrate at least covering said IC element and said antenna, wherein:

when a long axis of a planar shape of said antenna, the longest side, or the longest straight line obtained by connecting suitable two points with a straight line is longer than a short side of said IC card, and when said IC cards are piled up with the contours united, a projection drawing of an antenna of one IC card to an antenna surface of the other IC card has an area not overlapped to said other antenna surface on said projection surface, and said IC card can work.

5. An IC card at least comprising a first substrate, an IC element arranged on a fixed portion of said first substrate, an antenna electrically connected to said IC element, and a second substrate at least covering said IC element and said antenna, wherein:

when a long axis or the longest side of a planar shape of said antenna, or the longest straight line obtained by connecting suitable two points with a straight line is longer than a short side of said IC card, and when said IC cards are piled up with the contours united, a projection drawing of an antenna of one IC card to an antenna surface of the other IC card has an area not overlapped at least 15% or more of an area of the antenna to said other antenna surface on said projection surface.

6. An IC card at least comprising a first substrate, an IC element arranged on a fixed portion of said first substrate, an antenna electrically connected to said IC element, and a second substrate at least covering said IC element and said antenna, wherein:

when a long axis, the longest side of a planar shape of said antenna, or the longest straight line obtained by connecting suitable two points with a straight line is longer than a short side of said IC card, a shape of said antenna on said antenna surface is asymmetrical with respect to left and right and top and bottom.

7. An IC card at least comprising a first substrate, an IC element arranged on a fixed portion of said first substrate, an antenna electrically connected to said IC element, and a second substrate at least covering said IC element and said antenna, wherein:

said antenna is a coil formed on said first substrate, and when said IC cards are piled up with the contours united, a projection drawing of an antenna of one IC card to an antenna surface of the other IC card has an area not overlapped to said other antenna surface on said projection surface, and said IC card can work.

8. An IC card at least comprising a first substrate, an IC element arranged on a fixed portion of said first substrate, an antenna electrically connected to said IC element, and a second substrate at least covering said IC element and said antenna, wherein;

said antenna is a coil formed on said first substrate, and when said IC cards are piled up with the contours united, a projection drawing of an antenna of one IC card to an antenna surface of the other IC card has an area not overlapped at least 15% or more of an area of the antenna to said other antenna surface on said projection surface.

9. An IC card at least comprising a first substrate, an IC element arranged on a fixed portion of said first substrate, an antenna electrically connected to said IC element, and a second substrate at least covering said IC element and said antenna, wherein said antenna is a coil formed on said first substrate, and a shape of said antenna on said antenna surface is asymmetrical with respect to left and right and top and bottom.

10. An IC card according to claim 1, wherein a planar shape to be a fundamental of said antenna is an ellipse.

11. An IC card according to claim 1, wherein a planar shape to be a fundamental of said antenna includes a straight line portion.

12. The IC card according to claim 1, wherein a planar shape to be a fundamental fo said antenna is replaced in a corner portion of a polygon with curved line.

13. An antenna part material at least comprising a first substrate, an antenna arranged on a fixed portion of said first substrate, and a second substrate at least covering said antenna, said antenna part material capable of carrying out transmission and reception of a signal by wireless, wherein:

when said antenna part materials are piled up with the contours united, a projection drawing of an antenna of antenna part material to an antenna surface of the other antenna part material has an area not overlapped to said other antenna surface on said projection surface, and said antenna part material can work.

14. An antenna part material at least comprising a first substrate, an antenna arranged on a fixed portion of said first substrate, and a second substrate at least covering said antenna, said antenna part material capable of carrying out transmission and reception of a signal by wireless, wherein:

when said antenna part materials are piled up with the contours united, a projection drawing of an antenna of antenna part material to an antenna surface of the other antenna part material has an area not overlapped at least 15% or more of an area of the antenna to said other antenna surface on said projection surface.

15. An antenna part material at least comprising a first substrate, an antenna arranged on a fixed portion of said first substrate, and a second substrate at least covering said antenna, said antenna part material capable of carrying out transmission and reception of a signal by wireless, wherein a planar shape on said antenna surface of said antenna is asymmetrical with respect to left and right and top and bottom.

* * * * *